Jan. 20, 1931.　　　　J. K. WIRTH　　　　1,789,642
PROCESS OF MANUFACTURING LARGE RECEPTACLES
Filed Dec. 21, 1929
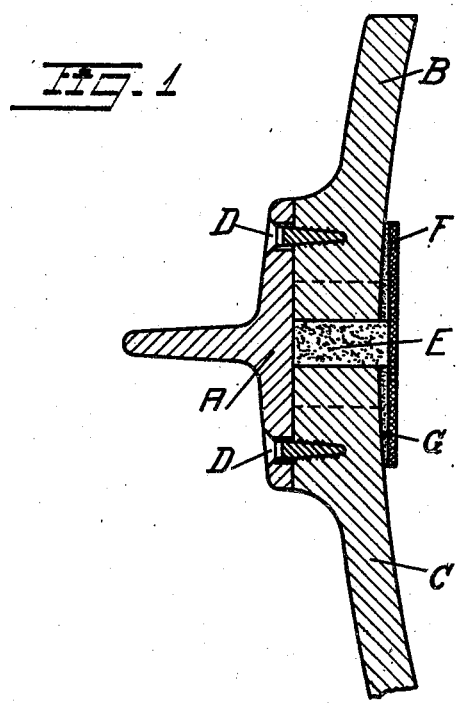
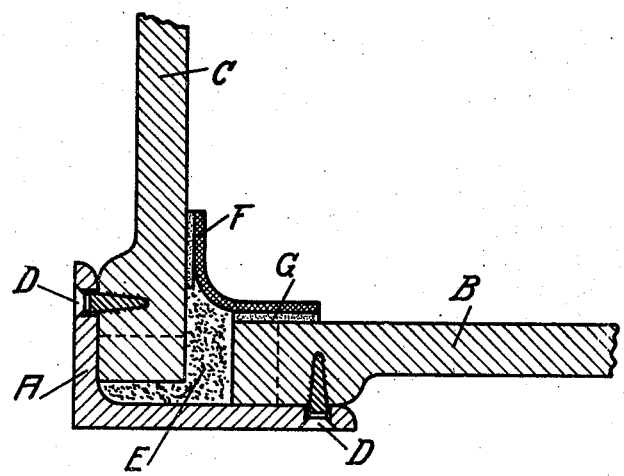
Inventor:-
Johann Karl Wirth Patented Jan. 20, 1931 1,789,642

UNITED STATES PATENT OFFICE

JOHANN KARL WIRTH, OF BERLIN, GERMANY

PROCESS OF MANUFACTURING LARGE RECEPTACLES

Application filed December 21, 1929, Serial No. 415,866, and in Germany September 26, 1928.

It is known to manufacture integral containers of very great dimensions such as cylindrical containers of 3 metres in height and 3 metres in diameter by means of artificial resins without seams and joints. The size of said containers is limited by the largeness of the hardening cylinders in use and especially by the dimensions of the conveying means since the dimensions of the containers must pass the clearance gauge of the railway. As the chemical industry needs however very large containers it is necessary to manufacture such containers by means of parts and to join said parts at the place of erection.

The subject matter of the present invention is to provide a method for manufacturing containers of every dimension without using a hardening cylinder. The containers are manufactured by means of parts and the seams and joints are closed by the material from which the container is made. The finished container can be considered a seamless and jointless container, which possesses as great tightness as if it were manufactured all in one piece.

In the accompanying drawing the subject matter of the invention is illustrated by way of example. In said drawing:

Figure 1 a joint between two walls and
Figure 2 a joint between two plates in an angle to one another.

In putting the new method into effect an iron skeleton A according to Figure 1 is erected and the plates or parts B and C manufactured from hardened artificial resin are secured to the iron skeleton A and fastened by means of screws D. Said screws are screwed in from the outer side and care has to be taken not to touch or to hurt the inner wall. The edges of the plates B and C are preferably strengthened as shown in the figures and are provided, if desired, with projecting parts and recesses meshing with one another. The space left between the plates and segments B and C will be about 20-30 mm. and this is filled with a pasty mixture of artificial resin E which has not yet hardened and is the same as the material from which the said segments were manufactured. All seams and joints are covered by a sheet F made from artificial resin, and which is stuck to the plates B and C by a cement G of artificial resin, which hardens when cold. The soft artificial resin, which has been placed into space E is now fully enclosed from the atmosphere and cannot escape when it is heated during the following step of manufacture. The pasty mass in the space E is pressed together by the pressure created during the heating process, and bubbles cannot occur as there is no space for the occurence of the same. This is the reason why it is not necessary to use a hardening cylinder, and it will be sufficient, if the finished container is closed by a cover and the heating medium is brought into it or created in it. The temperature of the heating air will be 120–140° C. according to the kind of artificial resin used. To create said temperature presents no technical difficulties.

After the heating period the container is comparable to an integral tank. Experiments have shown that the tightness of a container made according to the invention is so great that after the hardening is completed the screws D can be dispensed with without influencing the containing qualities of the container.

According to Figure 2 the plates B and C are arranged at an angle to one another. The angle iron A covers the enlarged edges of the said plates B and C. Screws D are screwed through the angle iron A into the enlarged parts of the plates B and C without protruding from the inner wall of said plates. The space E between the plates B, C and the angle iron A is filled with artificial resin of the same kind as that from which the plates are manufactured. A sheet F curved according to the angle of the plates B and C is put into the corner and is stuck by a cement G to said plates. The artificial resin in the space E then is hardened in the same way as pointed out with respect to the construction shown in Figure 1.

I claim:

A process of manufacturing large receptacles, containers, vessels and the like adapted to be jointed of plates, segments, or elements manufactured from artificial resins, which comprises fastening the hardened plates to a metallic skeleton, then filling the space between the said plates and the skeleton with a pasty unhardened composition of artificial resins, then covering the said joint with a sheet of hardened artificial resin adapted to be stuck to the plates by the intermediary of a cement hardening when cold, and then hardening the artificial resin within the joint by means of heat.

In testimony whereof I affix my signature.

JOHANN KARL WIRTH.